(12) United States Patent
Roka

(10) Patent No.: US 7,979,912 B1
(45) Date of Patent: Jul. 12, 2011

(54) METHOD AND SYSTEM FOR VERIFYING NETWORK CREDENTIALS

(75) Inventor: Pujan K. Roka, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1117 days.

(21) Appl. No.: 11/736,941

(22) Filed: Apr. 18, 2007

(51) Int. Cl.
 *G06F 7/04* (2006.01)
 *G06F 17/30* (2006.01)
 *H04N 7/16* (2006.01)

(52) U.S. Cl. .......................................................... 726/28

(58) Field of Classification Search ..................... 726/28
 See application file for complete search history.

(56) References Cited

U.S. PATENT DOCUMENTS

| | | | | |
|---|---|---|---|---|
| 6,976,086 | B2* | 12/2005 | Sadeghi et al. | 709/236 |
| 2003/0184793 | A1* | 10/2003 | Pineau | 358/1.15 |
| 2006/0047783 | A1* | 3/2006 | Tu | 709/220 |

* cited by examiner

*Primary Examiner* — Jason K Gee

(57) ABSTRACT

The present invention provides a method and system for verifying network credentials. To accomplish the invention, a network intermediary, located in a communication path between a client device and a content server, receives from the client device a request for content directed to the content server, wherein the request includes a device identifier and a password. The network intermediary responsively looks up a user identifier associated with the device identifier, modifies the request to include the user identifier, and then sends the modified request along to the content server. The content server receives the request and determines whether a combination of the device identifier and the user identifier exists within a dataset of known combinations. If it exists, the content server may validate the request by reference to the password. If not, the content server adds the combination to the dataset and requests a new password from the user.

17 Claims, 9 Drawing Sheets

CLIENT DEVICE

FIG. 4

CLIENT DEVICE DATA

| FIRST USER_ID | PASSWORD |
|---|---|
| ashley@sprintpcs.com | ashley1234 |
| brad@sprintpcs.com | PaSSworD1a |
| brad@bradmail.com | passWORD2 |

FIG. 5

CLIENT DEVICE DATA

| FIRST USER_ID | PASSWORD | URL |
|---|---|---|
| ashley@sprintpcs.com | ashley1234 | http://www.sprintpcs.com/mail |
| brad@sprintpcs.com | PaSSworD1a | http://www.sprintpcs.com/videos |
| brad@sprintpcs.com | PaSSworD1b | http://www.sprintpcs.com/music |
| brad@bradmail.com | passWORD2 | http://www.mailhost.com/login.asp |

NETWORK INTERMEDIARY

FIG. 7

NETWORK INTERMEDIARY DATA

| DEVICE_ID | SECOND USER_ID |
|---|---|
| 12345678901 | 000000-111111 |
| 34567890123 | 000000-222222 |
| 89012345678 | 000000-333333 |
| 10203040506 | 000000-545454 |

FIG. 9

COMBINATION REFERENCE DATA

| DEVICE_ID | SECOND USER_ID |
| --- | --- |
| 12345678901 | 000000-111111 |
| 34567890123 | 000000-222222 |
| 89012345678 | 000000-333333 |

FIG. 10

COMBINATION REFERENCE DATA

| DEVICE_ID | FIRST USER_ID | SECOND USER_ID |
| --- | --- | --- |
| 12345678901 | ashley@sprintpcs.com | 000000-111111 |
| 34567890123 | brad@sprintpcs.com | 000000-222222 |
| 34567890123 | brad@bradmail.com | 000000-222222 |
| 89012345678 | charles@sprintpcs.com | 000000-333333 |

METHOD AND SYSTEM FOR VERIFYING NETWORK CREDENTIALS

FIELD OF THE INVENTION

The present invention relates to telecommunications and, more particularly, to verifying network credentials.

BACKGROUND

When a user of a mobile device (or indeed any client device for that matter, whether or not mobile/wireless) uses the device to send a content request via a network to a content server, the device may conventionally pull from its cache an indication of the user's ID and password. The device may then automatically provide those parameters, together with a device ID, in the content request to the content server. Because the user may have previously entered the user ID and password into the device and the device may have cached those values, the device may pull and send this information in the background, without the user needing to actively enter the user ID and password each time content is requested. The cached values may be specific to the content server/URL at issue or may be more general.

With a mobile device, the user ID may be a Network Access Identifier (NAI), typically assigned to the mobile device in association with the user's mobile service plan. An NAI may take the form username@domain, such as johnqpublic@sprint.com for instance. The device ID may be an ID that uniquely identifies the mobile device, such as an Electronic Serial Number (ESN).

A problem with this general arrangement is that a device may change hands from one user to another and thus from one user account to another. When a device switches to a new user account, a different username (e.g., NAI) would likely be associated with the new account. However, there is still a chance that the device may bear in its cache the old account's (old user's) user ID and password. Consequently, when the device sends a content request, the device may automatically include within the content request the old user ID and password (together with the device ID), unbeknownst to the new user (or perhaps even with the knowledge of the new user). Unfortunately, the content server that receives such a request is unlikely to know that the user ID and password are not those of the current user/account. Thus, the content server may grant access to the requested content or other network resources in response to the provided user ID and password. This result is undesirable. The present invention provides a solution to help overcome this problem.

SUMMARY

The present invention provides a method and system for verifying network credentials. One embodiment of the present invention may take the form of a method that includes, at a network intermediary in a communication path between a client device and a content server, (i) receiving from the client device a request directed to the content server, wherein the request includes a device identifier and a password, (ii) responsively looking up a user identifier associated with the device identifier, (iii) modifying the request to include the user identifier, and (iv) sending the modified request along to the content server.

The method further includes, at the content server, receiving the modified request and making a determination of whether a combination of the device identifier and the user identifier exists within a dataset of known device identifier and user identifier combinations. If the determination is that the combination exists within the dataset of known combinations, then, at the content server and in response to the modified request, validating the request by reference to the password. If the determination is that the combination does not exist within the dataset of known combinations, then, at the content server, (i) adding the combination to the dataset of known combinations and (ii) sending to the client device a prompt for a user of the client device to enter a new password for use in validating the modified request.

Another embodiment of the present invention may take the form of a content server comprising: a network interface for providing connectivity with a network; a processor; data storage; reference data stored in the data storage that defines known combinations of device identifiers and user identifiers; and program instructions stored in the data storage. The program instructions are executable by the processor to carry out functions including: (i) receiving, via the network interface, a content request transmitted from a client device to the content server, wherein the content request provided by the client device includes a device identifier and a password, and wherein a network intermediary disposed between the client device and the content server adds to the content request a user identifier determined based on the device identifier so that the content request as received by the content server contains the device identifier, the password, and the added user identifier, (ii) making a determination, in response to the request, of whether a combination of the device identifier and user identifier is contained in the reference data, (iii) if the determination is that the combination is contained in the reference data, then validating the content request by reference to the password, and (iv) if the determination is that the combination is not contained in the reference data, then adding the combination to the reference data and sending to the client device a prompt for a user of the client device to enter a new password for use in validating the request. These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the present invention are described herein with reference to the drawings, in which:

FIG. 4 is an exemplary client device data table in accordance with an embodiment of the present invention;

FIG. 5 is an exemplary client device data table in accordance with an embodiment of the present invention;

FIG. 7 is an exemplary network intermediary data table in accordance with an embodiment of the present invention;

FIG. 9 is an exemplary content server data table in accordance with an embodiment of the present invention;

FIG. 10 is an exemplary content server data table in accordance with an embodiment of the present invention.

DETAILED DESCRIPTION

1. Exemplary Architecture

As a general matter, a network intermediary or network interface preferably sits within an HTTP communication path between a client device and a content server, so that it can detect and act on HTTP communications that pass between the client and the server.

The HTTP communication path between the client station and the content server can take various forms. Generally speaking, it is the path along which a request for content passes from the client station to the content server and along which a response to the request passes from the content server to the client station. Alternatively, separate HTTP communication paths may exist for the request and response and, for purposes of the present invention, the response communication path might not involve the network intermediary.

A request for content may be carried by a single HTTP request message that is sent from the client station to the content server. Or the request for content may be carried in multiple HTTP request messages, such as one that is sent from the client station to an intermediate point (e.g. proxy, portal, gateway, etc.) and another that is then sent from the intermediate point to the content server, for instance. Similarly, the requested content may then be carried in an HTTP response message that is sent from the content server to the client station. Or the content may be carried in multiple HTTP response messages, such as one that is sent from the content serve to an intermediate point and another that is then sent from the intermediate point to the client station, for instance. Additional steps may exist as well.

Figure 1:
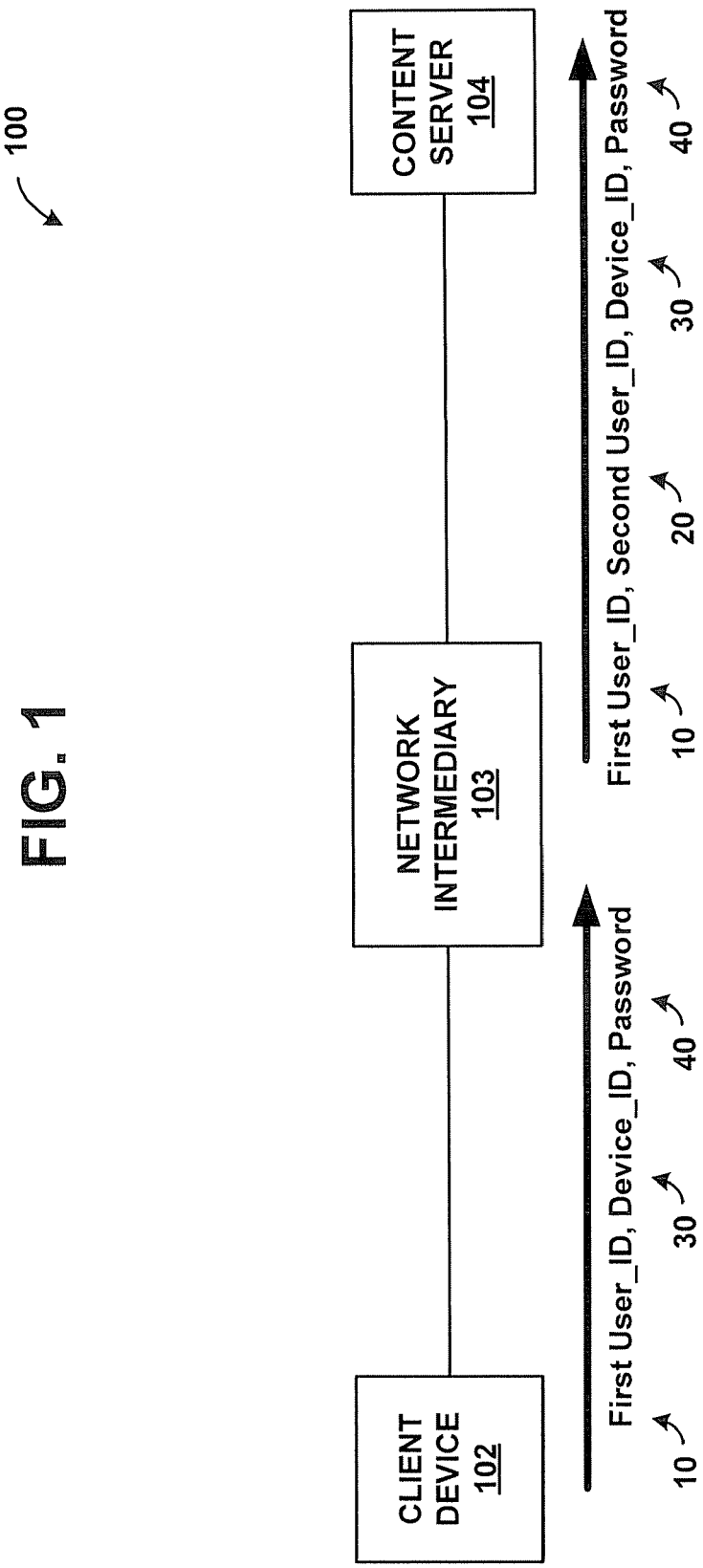
FIG. 1 is a block diagram of a simplified, exemplary communication path between a client device and a content server.

FIG. 1 illustrates a system 100 showing a simplified exemplary communication path between a client device and a content server. As depicted in FIG. 1, a client device 102 (such as a mobile phone, wireless personal digital assistant ("PDA"), or personal computer, for instance) may send a content request to a content server 104. The request from the client device may include a first User_ID 10, a Device_ID 30, and a password 40.

The first User_ID 10 is supposed to identify the registered user of the client device 102 and may be, for example, a Network Access Identifier (NAI) or an e-mail Client ID. The NAI or Client ID would typically be in the form username realm, such as johnqpublic@sprint.com, and may be assigned to the client device 102 in association with the registered user's service plan. However, the first User_ID 10 may be unreliable, as it may instead identify a former user of the client device 102. The same unreliability may attach to the password 40 as well.

The content request from the client device 102 may also include a Device_ID 30, such as an Electronic Serial Number (ESN), that uniquely identifies the client device 102. The ESN may be reliable because it is unique to the phone. Typically, an ESN may be 32 bits long and may consist of three fields, including an 8-bit manufacturer code, an 18-bit unique serial number, and 6 bits that may be reserved for later use. Other options for the Device_ID are also possible, including, but not limited to, a Mobile Directory Number (MDN), a Mobile Equipment ID (MEID), and an International Mobile Equipment Identity numbers (IMEI).

Before a content request sent by the client device 102 is received by the content server 104, the request may first be received by a network intermediary, such as the network intermediary 103. Upon receiving the content request, the network intermediary 103 may look up a second User_ID 20 that is associated with the Device_ID 30 contained within the content request. This second User_ID 20 may, for example, be a Subscription Identifier (Sub_ID). Further, the second User_ID may be unique for each subscriber account and associated only with client devices registered to that account; thus it may be more reliable as a user identifier than an NAI or ClientID.

The network intermediary 103 may modify the received content request to include the second User_ID 20 before sending the modified request to the content server 104. When the network intermediary includes the second User_ID 20 in the modified content request, the intermediary may include the both the first User_ID 10 and the second User_ID 20 in the modified request, or the intermediary may strip the first User_ID 10 from the request.

Upon receiving the modified content request, the content server 104 may extract the Device_ID 30 and the second User_ID 20 from the request. The content server 104 may then determine whether a combination of the Device_ID 30 and the second User_ID 20 exists within a dataset of known device identifier and user identifier combinations. For example, the content server 104 may query a database containing records of paired device and user identifiers, or the content server may consult a data table listing device identifiers associated with user identifiers, or vice-versa.

If the content server 104 finds that the received combination exists within the dataset, the content server 104 may then seek to validate the request by reference to the password. For example, the content server 104 may extract the password from the request and compare it to a list of known valid user identifier and password combinations. The content server 104 may use either the second User_ID 20 or the first User JD 10 for this purpose, or the content server 104 may use both the second User_ID 20 and the first User_ID 10 for this purpose.

If the content server 104 determines that the combination does not exist within the dataset of known combinations, it is possible that the password is not reliable and was not legitimately provided. Thus, the content server 104 may then send to the client device 102 a prompt for the user of the device to enter a new password 40 and/or a new first User_ID 10 for use in validating the content request. Additionally, the content server 104 may add the received second User_ID 20 and the Device_ID 30 as a known combination to the dataset of known user and device identifiers.

Figure 2:
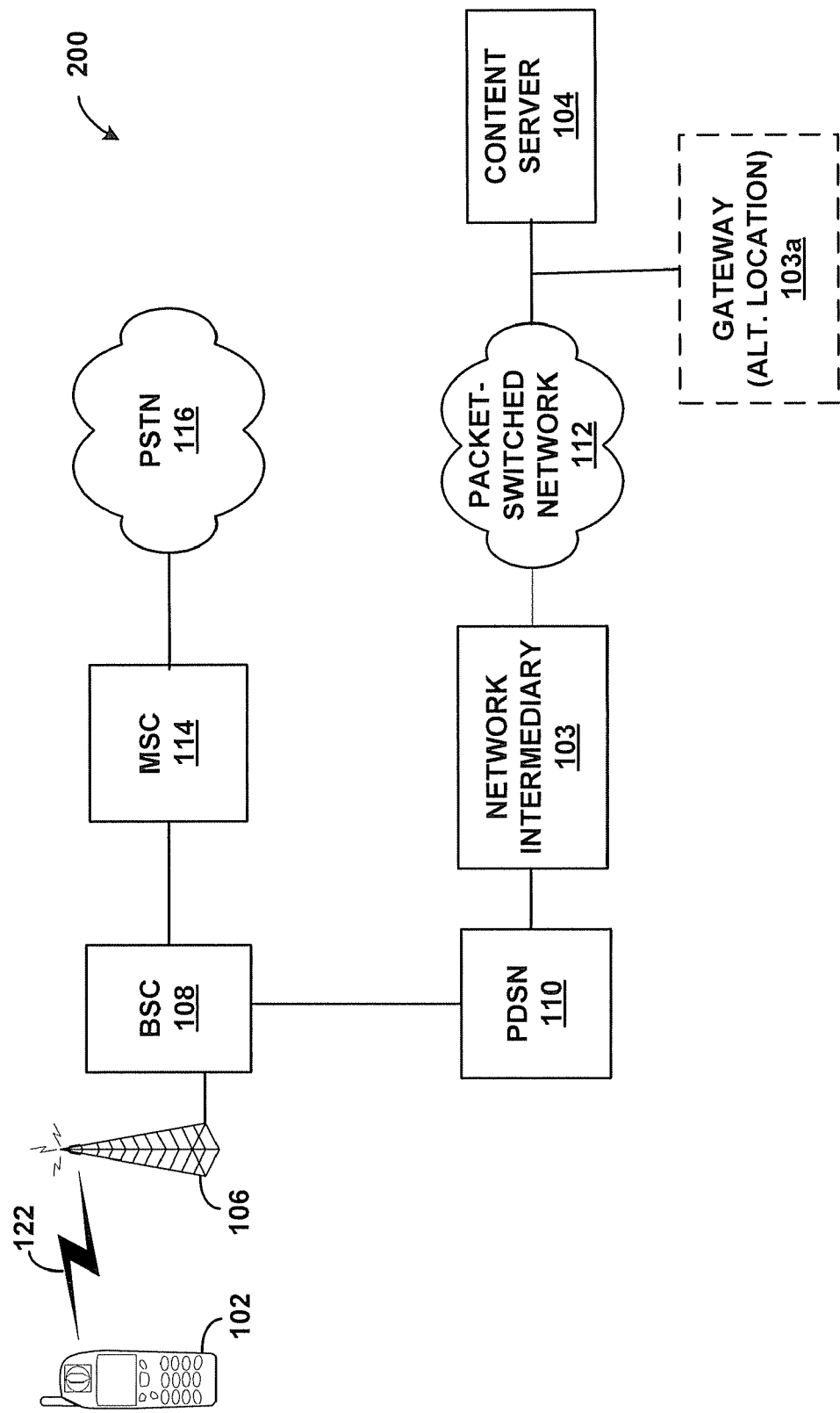
FIG. 2 is a block diagram of an exemplary communication system.

FIG. 2 illustrates a system 200 in which the communication path of one embodiment of this invention can be implemented. While FIG. 2 depicts one client device 102 accessing the wireless network for voice and/or data services, the wireless network may simultaneously provide service to a plurality of different client devices.

By way of example, the client device 102 of FIG. 2 may be a 3G or more advanced mobile client device such as a cellular or PCS telephone or personal digital assistant (e.g., Palm or Pocket-PC type device) for instance. As such, the client device 102 will likely have a relatively small display screen. Additionally, because the display screen will likely be too small to display full size HTML pages, the mobile station will likely be equipped with a "microbrowser," which is a web browser tailored to present web content on a smaller handset display. An exemplary microbrowser is the Openwave™

Mobile Browser available from Openwave Systems Inc., which can be arranged to provide mobile information access through compliance with the industry standard Wireless Application Protocol (WAP) as well as various markup languages such as HDML, WML, XHTML, and cHTML.

As another example, the client device 102 of FIG. 2 could be a full scale computing platform, such as a desktop or notebook personal computer, equipped with a wireless communication interface to facilitate communication over the wireless network. For instance, a personal computer could be linked to a 3G or more advanced handheld device, or the personal computer could include a plug-in card (e.g., PCI card or PCMCIA such as the AirCard® available from Sierra Wireless, Inc.) that provides for wireless communication. Further, the client device 102 might have a full scale web browser such as Microsoft Internet Explorer® or Netscape Navigator® for instance, which can conventionally receive and interpret HTML web content.

The client device 102 may communicate with an access point for the wireless network, such as a base station 106, through an air interface 122. The air interface might carry wireless communications in compliance with any radio communication protocol. This description will consider CDMA by way of example. CDMA is merely one example of a protocol that can be used for communication between the client device 102 and the access point 106. The client device 102 and the access point 106 may alternatively or additionally communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Mobile Communication ("GSM"), IS-136, Wireless Application Protocol ("WAP"), time division multiple access ("TDMA"), Worldwide Interoperability for Microwave Access ("WiMAX"), Integrated Digital Enhanced Network ("iDEN"), or other protocols. Additional wireless protocols, such as any IEEE 802.11 protocols, Bluetooth™, or others, may also be used.

CDMA provides a method for sending wireless signals between the client device 102 and the base station 106. In a CDMA system, the base station 106 communicates with the client device 102 over a spread spectrum of frequencies. In such a CDMA system, multiple client devices may use the same frequency range, and the multiple client devices may each simultaneously communicate with the base station 106 using the same frequency range. Spreading the signal across a wide bandwidth can reduce interference between signals from different client devices.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

The base station 106 of FIG. 2 may be coupled to a base station controller (BSC) 108, which can perform various functions, such as managing handoffs of the client device 102 as it moves among base stations in the wireless network. The BSC 108, in turn, may connect to a mobile switching center ("MSC") 114. The MSC 114 can manage setup and teardown of connections with the client device 102. While the BSC 108 and the MSC 114 are depicted as separate components, it is possible that their functionality may be combined into a single component.

If required, the MSC 114 may provide connectivity to the public switched telephone network (PSTN) 116. Through this connectivity, the client device 102 may first access the wireless network for voice services and then establish a circuit-switched connection with another device on the PSTN 116, on the wireless network, or on another network.

Preferably, the client device 102 may establish a data connection with the wireless network in order to engage in packet-switched communications with another entity, such as the content server 104. To establish such a data connection, the BSC 108 may interface with a packet data serving node (PDSN) 110. The PDSN 110 can provide connectivity to a packet-switched network 112, which may comprise either or both of a private packet-switched network and a public packet-switched network, such as the Internet.

More specifically, each client device that supports packet-data connectivity can engage in packet-data communication over a packet network, such as the packet-switched network 112, after acquiring a radio link over an air interface and a data link with a PDSN.

For example, client device 102 can send an origination message to BSC 108 and/or MSC 114 asking for a radio link for packet-data communication. The BSC 108 can then responsively instruct the client device 102 to operate on a given traffic channel over the air interface 122. Through that traffic channel, the client device 102 might then negotiate with PDSN 110 to establish a data link.

Continuing along the exemplary communication described by FIG. 2, a network intermediary may be disposed in the data connection path between the client device 102 and the content server 104. For example, a network intermediary 103 may be located between the PDSN 110 and the packet-switched network 112. Alternatively, the network intermediary may be part of the PDSN 110. As another alternative, the network intermediary may be communicatively coupled to the packet-switched network 112, as shown by network intermediary 103a, and any packet-switched communications originating from the client device 102 and destined for the content server 104 may be routed through the network intermediary 103a before being received by the content server 104. For purposes of this description, and unless otherwise specified, any references to, and/or descriptions of, network intermediary 103 should be construed as additionally or alternatively referring to, and/or describing, network intermediary 103a.

An example of the network intermediary 103 in the present invention might be a gateway, such as a WAP gateway. A WAP gateway, in addition to carrying out the functions described in the present invention, may also transcode web content being sent from the content server 104 to client device 102. This transcoding serves to put the transmitted web content and HTTP signaling into a form suitable for reference by, for example, a microbrowser on the client device 102.

Alternatively or additionally, the network intermediary 103 might function as a proxy server. As with a gateway, a proxy server may be added anywhere within the HTTP communication path between the client station 102 and the content server 104. In the figure, the network intermediary 103 is located within the communication path between the client station 102 and the packet-switched network 112 and may function as a proxy server. Alternatively, the network intermediary may reside elsewhere in the HTTP communication path, such as elsewhere on the packet-switched network 112, as indicated by network intermediary 103a. Further, multiple proxy servers may be provided.

FIG. 2 may be further used to describe the flow of an exemplary request for content sent from the client device 102 and directed to the content server 104. To engage in packet-based communications on the packet-switched network, the client device 102 might use various protocols to engage in data communications with other entities, such as the content server 104. In accessing the wireless network for data services, the client device 102 may establish a Point-to-Point Protocol ("PPP") session with the PDSN 110. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices. PPP is described in more detail in Internet Engineering Task Force ("IETF") Request for Comments ("RFCs") 1661, 1662, and 1663, all of which are incorporated herein by reference in their entirety.

While the client device 102 may communicate with the PDSN 110 through a PPP session, it may communicate with other entities on the packet-switched network 112 using higher level protocols. For example, and as previously described, the client device 102 may use the TCP/Internet Protocol (IP) protocol suite for transmitting data over a packet-switched network. Under TCP/IP, each network entity, including the client device 102, may receive a 32-bit IP address. The IP address assigned to an entity is usually globally unique, and therefore allows IP packets of data to be routed between different networks to a particular entity. An IP packet can include a header portion and a data portion. The header portion generally identifies a source device and a destination device, while the data portion carries the data to be transmitted between the two entities.

As a specific example, a browser running on client station 102 may generate an HTTP GET request, seeking content from content server 104. The client station 102 may then open a Transmission Control Protocol (TCP) socket with content server 104 and send the GET request through the network intermediary 103, which may act as a transparent proxy server, and through the packet-switched network 112 to the IP address of content server 104.

It is further possible that the network intermediary 103 may not act as a transparent proxy. As a result, separate TCP sockets may exist between the client station 102 and the network intermediary 103 on one hand and the network intermediary 103 and content server 104 on the other hand. Thus, the communication path may carry a request for content in an HTTP GET request from the client station 102 to the network intermediary 103 and then in another HTTP GET request from the network intermediary 103 or 103a to the content server 104.

Figure 3:
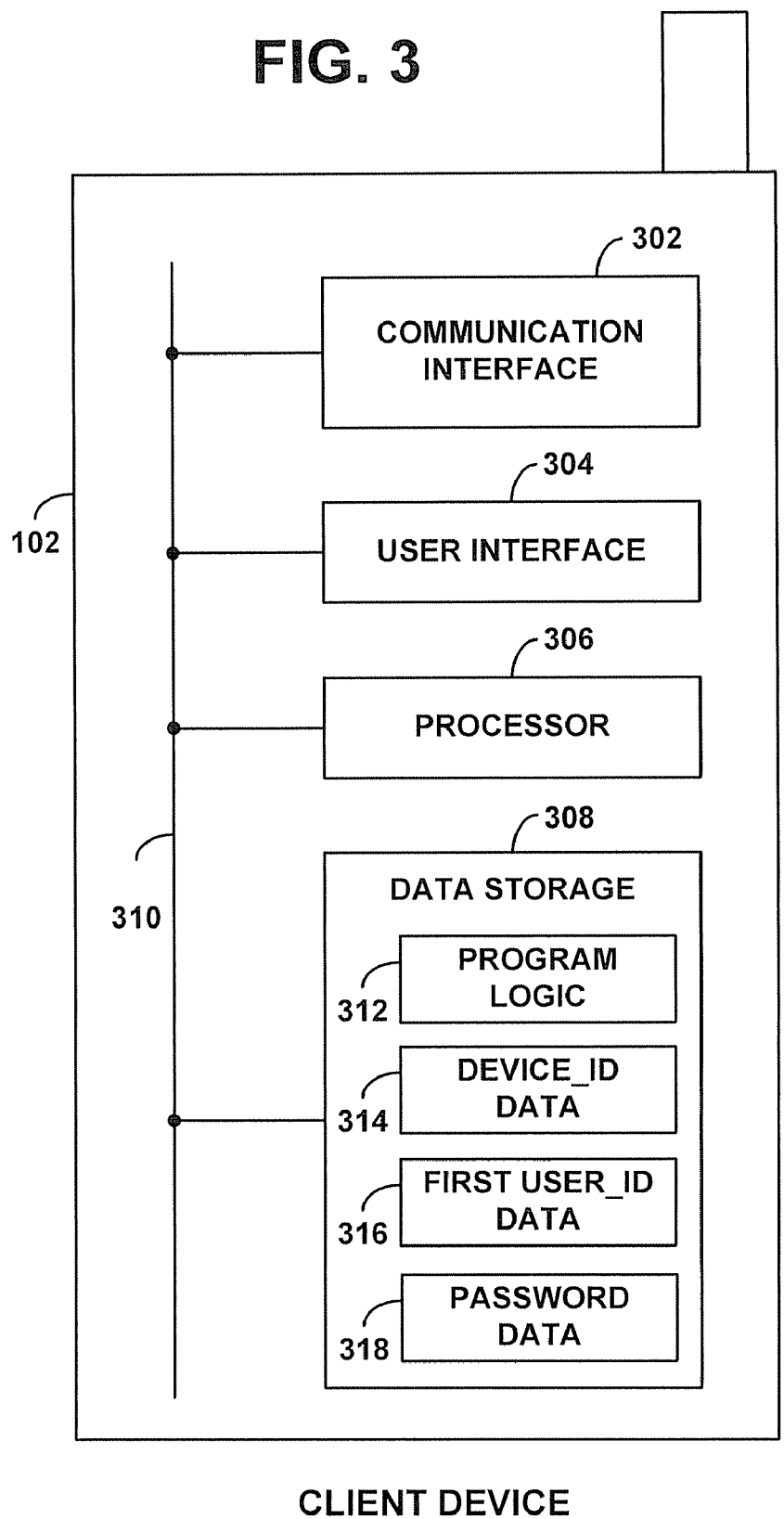
FIG. 3 is a block diagram illustrating exemplary components of a client device.

FIG. 3 is a block diagram showing exemplary components of a client device, such as client device 102. The client device 102 may include a communication interface 302, a user interface 304, a processor (i.e., one or more processors) 306, and data storage 308, all of which are communicatively coupled through a system bus 310. Other arrangements are possible as well. Client device 102 in FIG. 3 is graphically represented as a mobile device with an antenna for wireless communications; however, client device 102 need not be mobile and it need not have an antenna for wireless communications.

The communication interface 302 of client device 102 may be a cellular wireless communication interface that provides means for interfacing over air interface 122 and, in turn, with the packet-switched network 112. Specifically, communication interface 302 may include a chipset and antenna for performing wireless communication over the wireless air interface 122. An exemplary chipset that facilitates communication according to the CDMA air interface protocol is the MSM6000™ chipset manufactured by Qualcomm Incorporated of San Diego, Calif. The MSM6000™ may work in combination with the RFR6185 and RFT6150 chipsets also manufactured by Qualcomm Incorporated. Other examples of a chipset for performing wireless communication over the wireless air interface 122 and other examples of air interface protocols are also possible.

The communication interface 302 of client device 102 may alternatively, or additionally, include a chipset for performing other wireless or wireline communications. Performing other wireless communication may include transmitting data using wireless transceiver chipsets and antennas compatible with the IEEE 802.118 standard or other wireless communication standards or protocols. Performing wireline communications may include transmitting data using a fixed, physical connection, such as metal wire or fiber optic cable. The chipset for performing wireline communications may be mounted on a network interface card (NIC). An exemplary NIC with a chipset for performing wireline communications according to the Institute of Electrical and Electronics Engineers (IEEE) 802.38 standard for Carrier Sense Multiple Access with Collision Detection (CSMA/CD) Access Method is the SP2610R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

The communication interface 302 may transmit various types of data to the packet-switched network 112 and/or receive various types of data from the network 112. For example, the communication interface 602 may transmit at least one request for content through the air interface 122 and packet-switched network 112 to content server 104. As another example, the communication interface 302 may receive a password prompt sent from the content server 104 through the packet-switched network 112 and through the air interface 122.

The data storage 308 may comprise one or more volatile and/or nonvolatile storage components such as magnetic, optical, or organic storage and may store various types of data. The data storage 308 may store data such as Device_ID data 312, first User_ID data 316, and password data 318.

The data storage 308 may also store program logic 312 (e.g., program instructions) executable by the processor 306. The program logic 312 may contain instructions for providing services such as transmitting requests for content, receiving content, and presenting password prompts to a user through the user interface 304.

For example, to request web content, the program logic may contain a browser application suitable for requesting and receiving packet-data communications via the packet-switched network 112. In one embodiment, the browser application might be a WAP enabled Web browser that allows WAP Push communications. As a specific example, the browser application may request information from the content server 104 (or another network resource) by invoking a URL included in a WAP Push message. For instance, the browser application may request information from the content server 104 (or another network resource) via an HTTP GET request. Other examples are also possible.

FIGS. 4 and 5 depict example tables (such as look-up tables, for instance) of client device data. Each record is depicted as a row in the example table and includes a plurality of fields (which are depicted as columns). Thus, in the example table of FIG. 4, each record includes a first User_ID and a corresponding password. As shown, the first record contains a first User_ID in the form of the NAI "ashley@sprintpcs.com", which corresponds to the password "ashley1234". There may be more than one first User_ID, particularly in the case where the client device 102 has changed owners and the first User_ID of a previous owner is still stored within the data storage 308.

FIG. 5 shows an expanded version of the example table depicted in FIG. 4. The table in FIG. 5 further includes a content field which corresponds to particular first User_ID and password fields. As an example, the content in the content field may be identified by means of a uniform resource indicator (URI), or more specifically, a uniform resource locator (URL). In the example of FIG. 5, the first User_ID identified in the table corresponds to the content located at "http://www.sprintpcs.com/mail".

Figure 6:
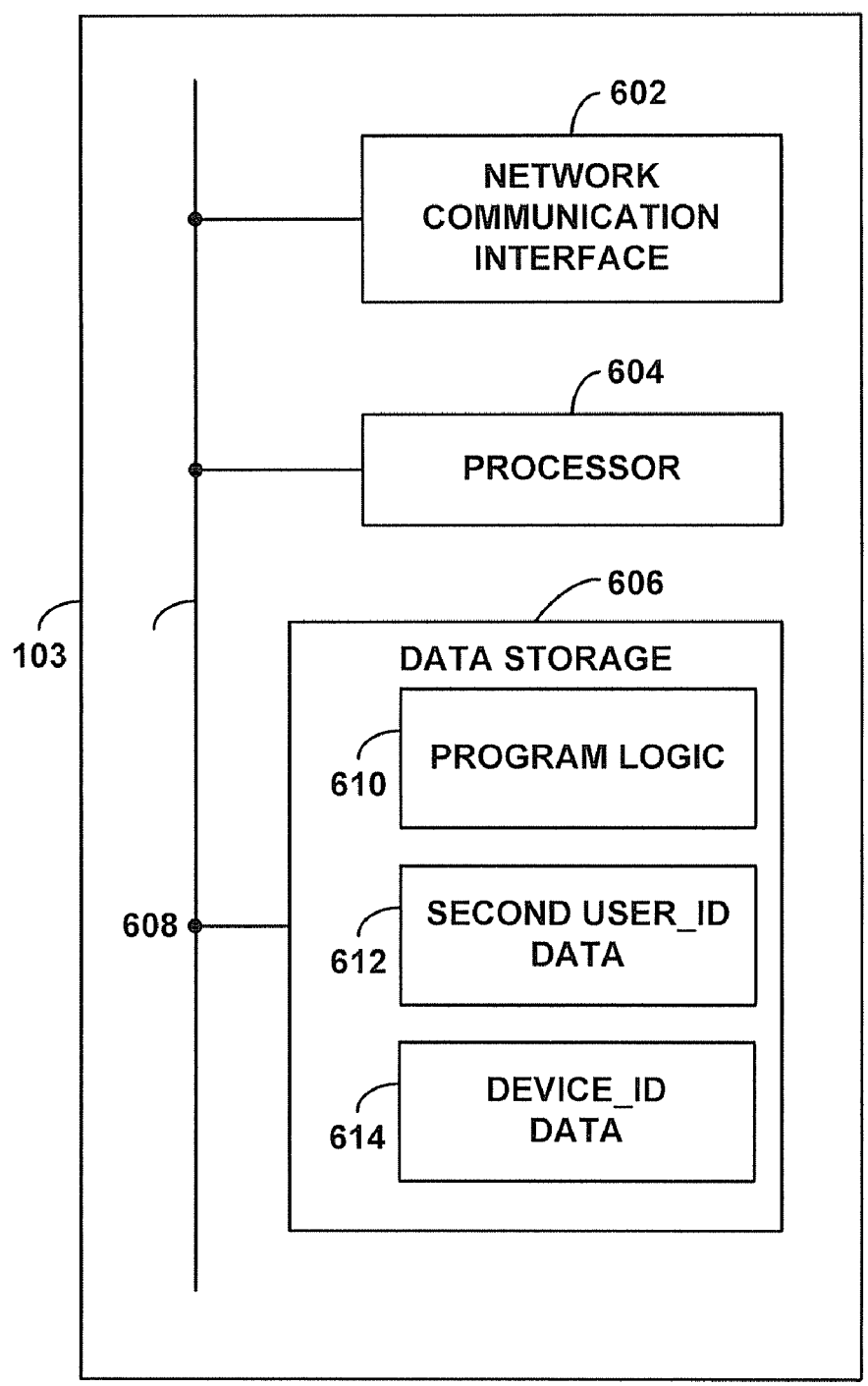
FIG. 6 is a block diagram illustrating exemplary components of a network intermediary in accordance with an embodiment of the present invention.

FIG. 6 is a block diagram showing exemplary components of a network intermediary, such as network intermediary 103. The network intermediary 103 may include a network communication interface 602, a processor (i.e., one or more processors) 604, and data storage 606, all of which are communicatively coupled through a system bus 608. Other arrangements are possible as well.

The network communication interface 602 may include a chipset for performing network communications, similar to the wireline communications described in reference to the client device 102 in FIG. 3. The network communication interface 602 may transmit various types of data to the packet-switched network 112 and to the client device 102 and/or receive various types of data from the network 112 and from the client device 102. For example, the network communication interface 602 may receive at least one request for content sent from the client device 102 and may send at least one modified request for content to the content server 104, both preferably in the form of IP packets that carry HTTP communications.

The data storage 606 may comprise one or more volatile and/or nonvolatile storage components such as magnetic, optical, or organic storage and may store various types of data. The data storage 606 may store data such as second User_ID data 612, and Device_ID data 614. The data storage 606 may also store program logic 610 (e.g., program instructions) executable by the processor 604. The program logic 610 may contain instructions for providing services such as receiving requests for content, extracting information from those requests, looking up second User_ID data 612 and Device_ID data 614 in data storage 606, modifying received requests for content, and sending modified requests to the content server 104.

In the preferred embodiment, the network intermediary would be located as shown in FIG. 2 at the location occupied by network intermediary 103. In such a location, the network intermediary 103 may easily intercept requests for content transmitted from the client device 102 and directed to the content server 104. As an example, the program logic 610 may contain instructions to sniff the header and/or data portions of each message passing through the network intermediary 103. If the message is a request for content sent from a client device, such as client device 102, and directed to a content server, such as content server 104, the network intermediary 103 may interrupt the transmission. As an example, if the message is an HTTP request for content, the processor 604 may pause transmission of the IP packet(s) that carry the HTTP message (i.e., temporarily pause the HTTP communication). Subsequently, the network intermediary 103, by means of the processor 604, may then use instructions in the program logic 610 to extract the Device_ID 30 from the request.

The network intermediary 103 may then look up in a table, such as the example table shown in FIG. 7, a second User_ID 20 that corresponds to the Device_ID 30. Each Device_ID 30 may be unique and may correspond to a unique second User_ID 20. For example, the second User_ID 20 may be indicative of the subscriber account under which the client device is registered for use. The network intermediary 103 may then modify the content request by inserting the second User_ID 20 into the header or data payload of the content request. The second User_ID 20 may either replace the first User_ID 10 by occupying the same field in the message as the User_ID 10 or the second User_ID 20 may be inserted in a different field in the message. The modified content request may then be forwarded by the network intermediary 103 to the content server 104.

Alternatively, the network intermediary may not be disposed between the PDSN 110 and the packet-switched network 112. Instead the network intermediary may occupy, for example, the location shown by network intermediary 103a in FIG. 2. In such a location, the network intermediary 103a may also intercept and modify requests for content transmitted from the client device 102 and directed to the content server 104. As an example, the network intermediary 103a may be located in the same local network as the content server 104 and be able to intercept messages directed to network entities on that local network, including messages directed to the content server 104. To accomplish this, the network intermediary 103a may have the same TCP/IP prefix as the content server 104. Further, the network intermediary 103a or another network or local network entity may have program logic that includes instructions to substitute the network intermediary 103a as the destination for messages that were received into the local network from a client device 102 and originally directed to the content server 104.

Figure 8:
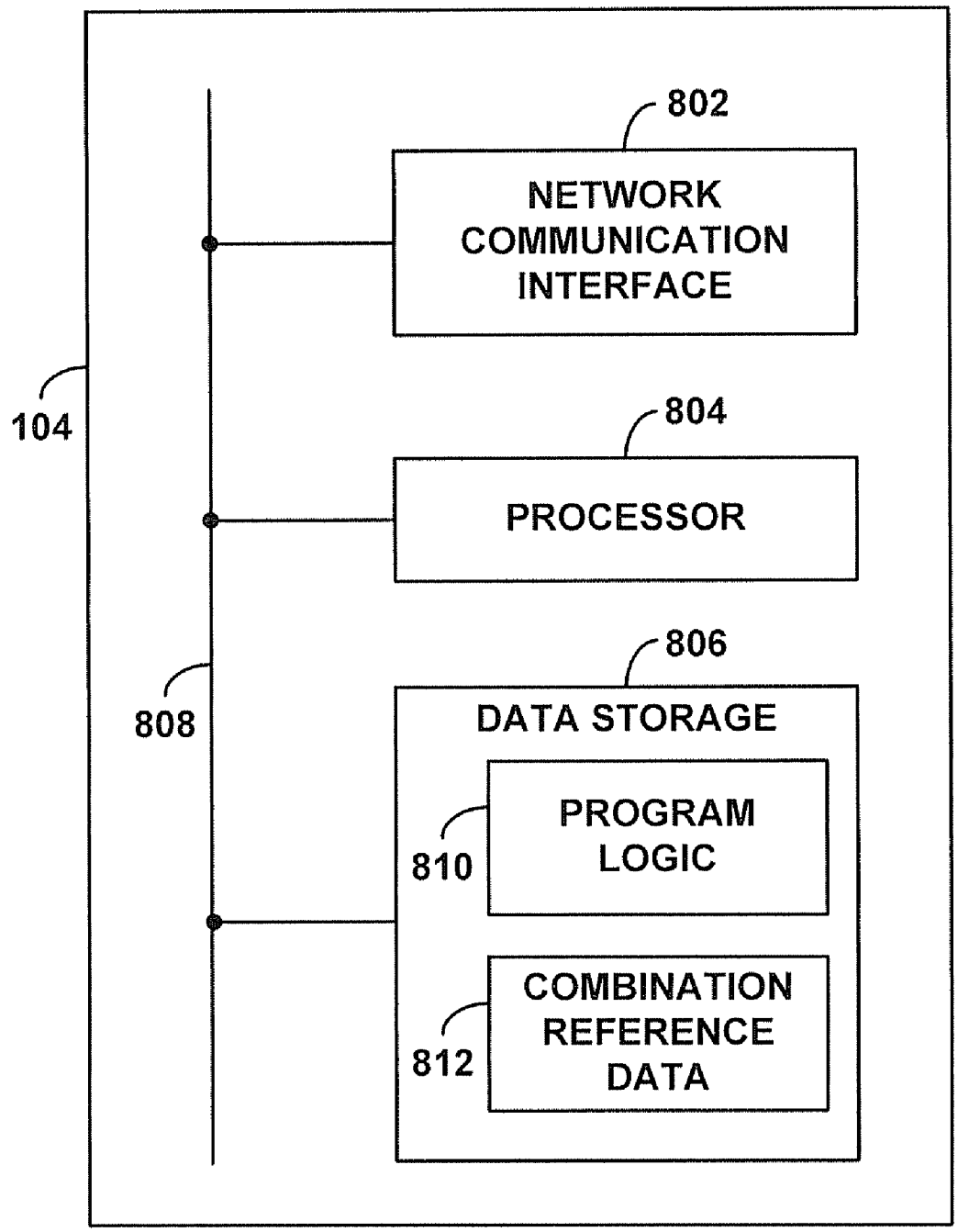
FIG. 8 is a block diagram illustrating exemplary components of a content server in accordance with an embodiment of the present invention.

FIG. 8 is a block diagram showing exemplary components of a content server, such as content server 104. The content server 104 may include a network communication interface 802, a processor (i.e., one or more processors) 804, and data storage 806, all of which are communicatively coupled through a system bus 808. Other arrangements are possible as well.

The network communication interface 802 of content server 104 may include a chipset for performing network communications, similar to the wireline communications described in reference to the client device 102 in FIG. 3. The network communication interface 802 may transmit various types of data through the packet-switched network 112 to the client device 102 and/or receive various types of data through the network 112 from the client device 102 or from the network intermediary 103. For example, the network communication interface 802 may receive at least one request or modified request for content and may send at least one prompt for a user of the client device 102 to enter a new password and/or user identifier.

The data storage 806 may comprise one or more volatile and/or nonvolatile storage components such as magnetic, optical, or organic storage and may store various types of data. The data storage 806 may store data such as combination reference data 812, as described with respect to FIGS. 9 and 10. The data storage 806 may also store program logic 810 (e.g., program instructions) executable by the processor 804. The program logic 810 may contain instructions for providing services such as receiving requests for content, extracting information from those requests, looking up combination reference data 812 in data storage 806, comparing the combination reference data 812 to information extracted from the request, validating passwords, sending content to the client device 102, and sending prompts for new passwords and/or user identifiers to the client device 102.

In a preferred embodiment, the content server 104 may use instructions in the program logic 610 to extract the Device_ID 30 and the second User_ID 20 from a received request for content. The content server 104 may then look up combination reference data 812 in a table, list, or database, such as the example table shown in FIG. 9, wherein the data may consist of known combinations of device identifiers and user_IDs. If the combination of the received Device_ID 30 and second User_ID 20 matches a record in the combination reference data table of FIG. 9, then the content server 104 may conclude that the request for content was from a registered user of the client device 102.

Alternatively, the content server 104 may use instructions in the program logic 610 to extract the Device_ID 30, the second User_ID 20, and the first User_ID 10 from the received request for content. The media server may then look up combination reference data 812 in a table, such as the example table shown in FIG. 10, wherein the data may consist of known combinations of device identifiers, first user_IDs, and second user_IDs. If the combination of the received Device_ID 30, second User_ID 20, and first User_ID 10 matches a record in the combination reference data table of FIG. 10, then the content server 104 may conclude that the request for content was from an authorized user of the client device 102.

In either the preferred embodiment, or any other embodiments, if a match is found, the content server 104 may then validate the request by reference to the password 40, which may be extracted from the modified request. If no match is found, the content server 104 may conclude that the client device 102 is in the possession of a new user. The content server 104 may then responsively send a prompt to the user of the client device 102 asking the user to enter a new password for use in validating the request for content.

The content server may also responsively enter the combination of the received second User_ID 20, the Device_ID 30, and if relevant to the embodiment, the first User_ID 10, as a new record in the combination reference data 812. Additionally, the content server 104 may search the combination reference data 812 for other combinations which contain the Device_ID 30 and may delete those combinations from the combination reference data 812.

It should be understood that all the arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware, and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

2. Exemplary Operation

Figure 11:
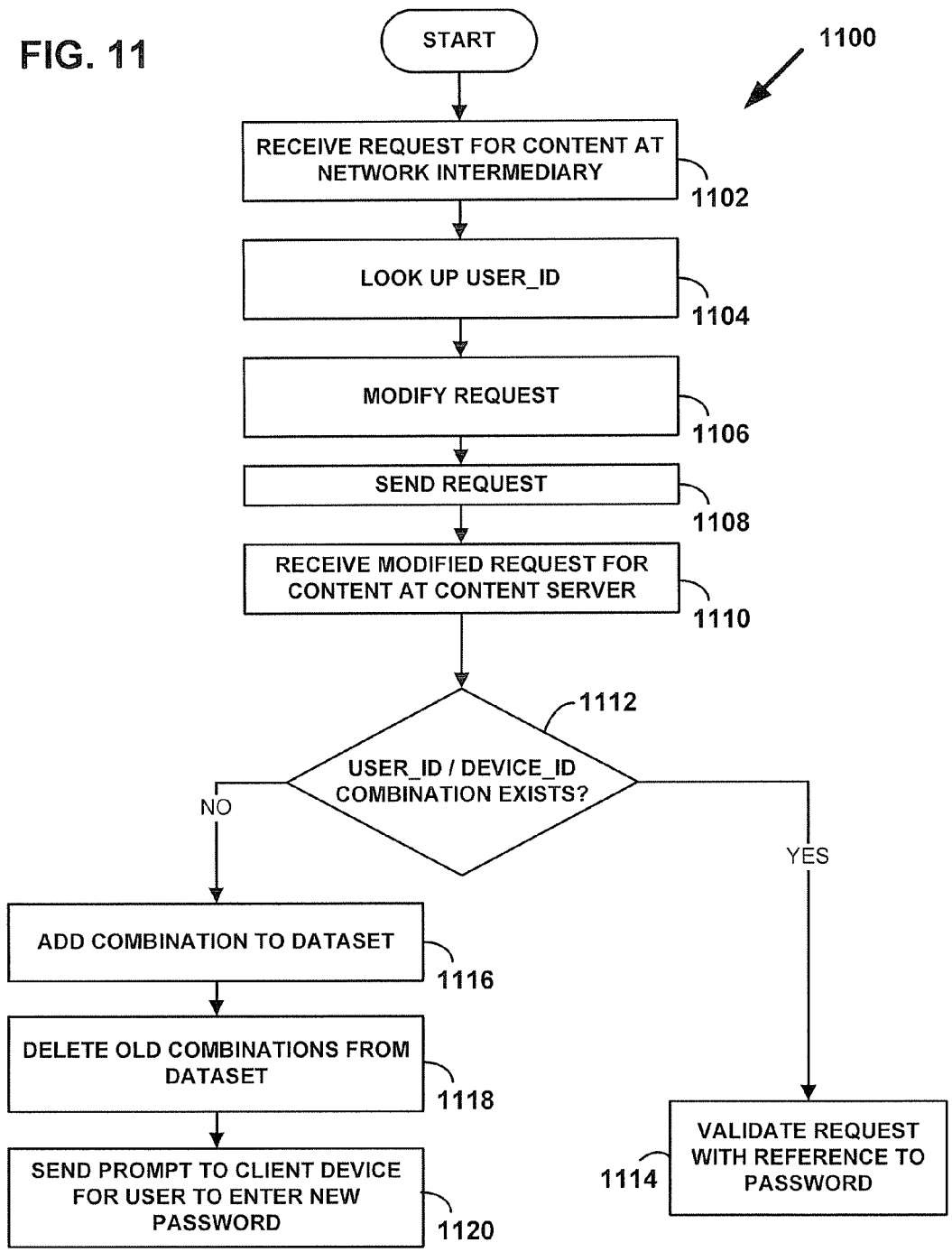
FIG. 11 is a flowchart illustrating a process carried out by a system in accordance with an exemplary embodiment.

FIG. 11 is a flow chart showing a method 1100 illustrating some functions that may be carried out in accordance with exemplary embodiments of the present invention. The functions shown in FIG. 11 may be carried out in an order as shown. Moreover, the functions may be carried out discretely or two or more of the functions may be carried out in combination. Further, some functions may not be carried out and/or functions may be carried out in an order not shown in FIG. 11.

At block 1102, a request for content transmitted by a client device 102 and directed to a content server 104 is received at a network intermediary 103. The request may contain a user identifier, such as User_ID 10, a device identifier, such as Device_ID 30, and a password, such as password 40. As an example, the User_ID 10 may be an NAI or e-mail Client_ID and the Device_ID 30 may be an ESN or MDN.

The request may be received by the network intermediary 103 through any applicable means. For example, the request may be electronically routed through the network intermediary 103 en route to the content server as a result of the wireline configuration. As another example, the request may be electronically routed through the network intermediary 103 as a result of the electronic destination address of the request, such the destination address contained within a TCP/IP message header. As another example, the client device 102 might be set to direct all content requests to the network intermediary 103.

More specifically, in order to carry out the invention in a preferred embodiment, requests for content from the client device 102 will be made to pass to the network intermediary 103, such that the network intermediary 103 may intercept and forward each content request to an appropriate content provider, such as the content provider 104. To accomplish this, the network intermediary 103 may be positioned in (or at the edge of) an access channel so that all client device 102 communications to the packet-switched network 112 pass through the network intermediary 103.

Alternatively, the network intermediary may be positioned elsewhere, such as at network intermediary 103a, and the client device 102 (or some other entity) may be set to send content requests from the client device 102 to the network intermediary 103a. For instance, the client device 102 may be set to use the network intermediary 103a as a proxy server for some or all content requests, so that the client device 102 sends those content requests to the network intermediary 103a.

As an example implementation, a user of a WAP-capable client device, such as client device 102, may seek to obtain streaming media content. The user may browse to a Web page and click on a link to receive a particular stream of media content. In response, a media player application contained within the program logic on the client device 102 might send an RTSP "DESCRIBE" request. The message would first pass to the network intermediary 103 for transmission in turn to a content server indicated by a URL in the DESCRIBE header. The DESCRIBE request may contain, in addition to the usual parameters, an "x-pcs-mdn" parameter that specifies a device identifier, such as Device_ID 30. As is known in the art, a request for content can conventionally include an x-pcs-mdn parameter that specifies the unique device requesting the content.

At block 1104, the network intermediary 103 may extract the Device_ID 30 from the request and, using that Device_ID 30, look up a user identifier, such as the second User_ID 20, that corresponds to the Device_ID 30. Specifically, the network intermediary 103 may receive the DESCRIBE request discussed above and may read the value of the "x-pcs-mdn" parameter before looking up the user identifier.

At block 1106, the network intermediary may modify the received request for content by inserting the second User_ID 20 into the request. For example, the second User_ID 20 may replace the first User_ID 10 in the request. Alternatively, the second User_ID 20 may be added to a different field in the request, regardless of the presence of the first User_ID 10. For example, the second User_ID 20 may be added as a header or data field in an HTTP message request. For example, if the request for content is directed to a Sprint e-mail server, the second User_ID 20 may be a Sub_ID and the Sub_ID may be added as a static base64 encoded value to an "x-pcs-subid" parameter of the modified content request. In this regard, as is known in the art, a request for content can conventionally include an "x-pcs-subid" parameter that specifies the unique subscription identifier of the requesting Sprint user. Additionally, the network intermediary may send the Device_ID 30 as a static base64 encoded value in an "x-pcs-mdn" parameter of the modified content request.

After modifying the request, the network intermediary sends the modified request to a content server, as shown at block 1108. For example, the network intermediary 103 may proxy the above-mentioned DESCRIBE request to the designated content server 104.

At block 1110, the modified request is received at a content server 104. The content server 104 may then extract a device identifier, such as Device_ID 30, and a user identifier, such as second User_ID 20, from the request. The content server 104 may then determine whether a combination of the device identifier and the user identifier exists with a dataset of known device identifier and user identifier combinations. For example, the content server 104 may compare the received Device_ID 30 and second User_ID 20 combination to a table of ESN and Sub_ID combinations. Alternatively, the content server 104 may compare the received Device_ID 30 and second User_ID 20 combination to a table of MDN and Sub_ID combinations. As another alternative, the content server 104 may also extract another user identifier from the modified request, such as first User_ID 10. The content server 104 may then compare the received first User_ID 10, second User_ID 20, and Device_ID 30 combination to a table of ESN, NAI, and Sub_ID combinations. The content server 104 may also compare the received combination to a table of MDN, NAI, and Sub_ID combinations, or any other combination of user identifiers and device identifiers.

At block 1114, if a combination match is found in the dataset of known device identifier and user identifier combinations, the content server 104 may then validate the request by reference to the password 40, which may be extracted from the request.

If no match is found, then at block 1116 the content server 104 may responsively enter the combination of the received second User_ID 20, the Device_ID 30, and if relevant to the embodiment, the first User_ID 10, as a new combination into the dataset of known device identifier and user identifier combinations. At block 1118, the content server 104 may search the dataset of known combinations for other combinations which contain the received Device_ID 30 and may delete those combinations from the dataset. Each of these deleted combinations may represent a combination of a device identifier paired with a former owner of the client device 102. At block 1120, the content server may send a prompt to the user of the client device 102 asking the user to enter a new password for use in validating the request for content.

As another example implementation of the invention, consider a scenario where a user of a client device 102 (such as a wireless or landline station) seeks to obtain content from a particular secure Web page. Conventionally, the user may attempt to browse to the secure Web page, thereby causing a browser on the client device 102 to send an HTTP GET request. That HTTP GET request would pass to the network intermediary 103 for eventual transmission to a content server 104 indicated by a URL in the DESCRIBE header. According to the invention, the HTTP GET request may contain an NAI and a password which were contained in the client device's cache. The NAI may not reliably correspond to the actual user of the client device, as it may be the NAI of a former owner user of the device. The HTTP GET request may also contain a device identifier, such as the device ESN, which reliably corresponds to the device.

Upon receipt of the HTTP request, the network intermediary 103 may read the value of the device ESN and lookup the subscription identifier uniquely associated with the device identifier. The network intermediary may then insert the subscription identifier into the HTTP request as a more reliable user identifier.

The network intermediary 103 may then proxy the HTTP GET request to the designated content server 104. The content server 104 may then determine whether the inserted and more reliable subscription identifier and device identifier exists within a list of known subscription and device identifier combinations. If the combination exists in the list, the content server 104 may conclude that the user requesting content is a valid user and the content server 104 may then use the password (with or without the original NAI) to validate access to the secure Web page. If the combination does not exist, then the content server may conclude that the password and/or the NAI included with the HTTP request is unreliable and may consequently transmit an HTTP response or HTTP error, such as a "400" series HTTP message, to the user of the client device, prompting the user to enter a new password and/or NAI.

3. Conclusion

Several exemplary embodiments of the present invention have been described above. Those skilled in the art will understand, however, that changes and modifications may be made to these embodiments without departing from the true scope and spirit of the present invention, which is defined by the claims.

I claim:

1. A method comprising:
   at a network intermediary in a communication path between a client device and a content server, (i) receiving from the client device a request directed to the content server, wherein the request includes a device identifier and a password, (ii) responsively looking up a user identifier associated with the device identifier, (iii) modifying the request to include the user identifier, and (iv) sending the modified request along to the content server;
   at the content server, receiving the modified request and making a determination of whether a combination of the device identifier and the user identifier exists within a dataset of known device identifier and user identifier combinations;
   if the determination is that the combination exists within the dataset of known combinations, then, in response to the modified request, validating the request by reference to the password; and
   if the determination is that the combination does not exist within the dataset of known combinations, then (i) adding the combination to the dataset of known combinations, (ii) sending to the client device a prompt for a user of the client device to enter a new password for use in validating the modified request, and (iii) identifying in the dataset at least one pre-existing combination that contains the device identifier, and deleting the at least one identified combination from the dataset.

2. The method of claim 1, wherein the client device comprises a wireless communication device.

3. The method of claim 2, wherein the device identifier comprises an electronic serial number of the wireless communication device.

4. The method of claim 2, wherein the device identifier comprises a mobile directory number of the wireless communication device.

5. The method of claim 2, wherein the network intermediary comprises a wireless access network intermediary through which network communications to and from the wireless communication device pass.

6. The method of claim 1, wherein the new password is the same as the password received in the request.

7. The method of claim 1, wherein the request received by the network intermediary further carries a first user identifier and wherein the user identifier added by the intermediary is a second user identifier.

8. The method of claim 7, wherein the dataset of known combinations comprises a dataset of known first user identifier, second user identifier, and device identifier combinations.

9. The method of claim 7, wherein validating the modified request by reference to the password comprises validating the request by reference to the first user identifier and the password.

10. The method of claim 7, wherein the first user identifier comprises a network access identifier.

11. The method of claim 7, wherein the second user identifier comprises a subscription identifier.

12. A content server comprising:
a network interface for providing connectivity with a network;
a processor;
data storage;
reference data stored in the data storage and defining known combinations of device identifiers and user identifiers;
program instructions stored in the data storage and executable by the processor to carry out functions including:

(i) receiving, via the network interface, a content request transmitted from a client device to the content server, wherein the content request provided by the client device includes a device identifier and a password, and wherein a network intermediary disposed between the client device and the content server adds to the content request a user identifier determined based on the device identifier so that the content request as received by the content server contains the device identifier, the password, and the added user identifier, (ii) making a determination, in response to the request, of whether a combination of the device identifier and user identifier is contained in the reference data, (iii) if the determination is that the combination is contained in the reference data, then validating the content request by reference to the password, and (iv) if the determination is that the combination is not contained in the reference data, then adding the combination to the reference data, sending to the client device a prompt for a user of the client device to enter a new password for use in validating the request, and identifying in the dataset at least one pre-existing combination that contains the device identifier, and deleting the at least one identified combination from the dataset.

13. The content server of claim 12, wherein the client device comprises a wireless communication device.

14. The content server of claim 13, wherein the device identifier comprises an electronic serial number of the wireless communication device.

15. The content server of claim 13, wherein the device identifier comprises a mobile directory number of the wireless communication device.

16. The content server of claim 13, wherein the network intermediary comprises a wireless access network intermediary through which network communications to and from the wireless communication device pass.

17. The content server of claim 12, wherein the new password is the same as the password received in the content request.

* * * * *